US012607336B1

(12) United States Patent
Rashidi Doust

(10) Patent No.: US 12,607,336 B1
(45) Date of Patent: Apr. 21, 2026

(54) DIMMING AND COLOR CHANGING LIGHT FIXTURE

(71) Applicant: Elite Lighting, Commerce, CA (US)

(72) Inventor: Hamid Rashidi Doust, Beverly Hills, CA (US)

( * ) Notice: Subject to any disclaimer, the term of this patent is extended or adjusted under 35 U.S.C. 154(b) by 8 days.

(21) Appl. No.: 18/812,987

(22) Filed: Aug. 22, 2024

Related U.S. Application Data

(60) Provisional application No. 63/681,749, filed on Aug. 9, 2024.

(51) Int. Cl.

| | |
|---|---|
| ***F21V 23/04*** | (2006.01) |
| ***F21V 19/00*** | (2006.01) |
| ***F21Y 113/17*** | (2016.01) |
| ***F21Y 115/10*** | (2016.01) |
| ***H05B 45/10*** | (2020.01) |
| ***H05B 45/20*** | (2020.01) |

(52) U.S. Cl.
CPC ............ *F21V 23/04* (2013.01); *F21V 19/006* (2013.01); *H05B 45/10* (2020.01); *H05B 45/20* (2020.01); *F21Y 2113/17* (2016.08); *F21Y 2115/10* (2016.08)

(58) Field of Classification Search
CPC ....... F21V 23/04; F21V 19/006; H05B 45/20; H05B 45/10
See application file for complete search history.

(56) References Cited

U.S. PATENT DOCUMENTS

2004/0085754 A1* 5/2004 Koren .................. H05B 47/155 362/96
2004/0105261 A1* 6/2004 Ducharme ............ F21V 23/045 362/231
2010/0213859 A1* 8/2010 Shteynberg .......... H05B 45/385 315/224
2017/0006684 A1* 1/2017 Tu .......................... H05B 45/20
2017/0223807 A1* 8/2017 Recker .............. H02J 13/00006
2017/0295630 A1* 10/2017 Lark, Jr ............... H05B 47/155
2018/0014381 A1* 1/2018 Lark, Jr. .............. H05B 47/105
2018/0035504 A1* 2/2018 Konishi ................. H05B 47/17
2022/0104325 A1* 3/2022 Jiang .................. H05B 45/3725

* cited by examiner

*Primary Examiner* — Bryon T Gyllstrom
(74) *Attorney, Agent, or Firm* — Payam Moradian

(57) ABSTRACT

Provided is a light fixture comprising: a. plurality of LED light sources, the LED light sources configured to produce differently colored lights; b. LED driver to power the LED light sources, the LED driver comprising a color changing module; c. a controller with two switches, a first switch for manually changing the color of the LED light sources, and a second switch for turning on and off the controller input relating to the color of the LED light sources; wherein when the second switch is in the off position, a switch on a dimmer directly communicates with the driver, the module of the driver automatically (automatic mode) changing the color according to input received from a switch on the dimmer.

11 Claims, 4 Drawing Sheets

AUTO 3000K _ 1800K max lumen _ min lumen

2000L _ 20L

FIG. 2

3000K _ 2000L

2500K _ 1300L

2000K _ 400L

1800K _ 20L

FIG. 3

DIMMING AND COLOR CHANGING LIGHT FIXTURE

CROSS-REFERENCE

The present application claims the benefit of provisional application No. 63/681,749, filed on Aug. 9, 2024, which is incorporated herein by reference.

BACKGROUND SECTION OF THE INVENTION

There are available light fixtures that allow for changing of the color of the light produced by the fixture. Consumers often struggle to change the color of the light fixture, often resorting to small buttons that are not conveniently located. There is a need in the art to have color changing light fixtures that are consumer friendly.

SUMMARY SECTION OF THE INVENTION

Provided is a light fixture comprising: a. plurality of LED light sources, the LED light sources configured to produce differently colored lights; b. LED driver to power the LED light sources, the LED driver comprising a color changing module; c. a controller with two switches, a first switch for manually changing the color of the LED light sources, and a second switch for turning on and off the controller input relating to the color of the LED light sources; wherein when the second switch is in the off position, a switch on a dimmer directly communicates with the driver, the module of the driver automatically (automatic mode) changing the color according to input received from a switch on the dimmer. The light fixture has LED light sources with at least two different colors. The module has a microprocessor. The first switch and the second switch are dip switches. In the automatic mode, changing a switch on the dimmer changes the color and dimming together according to a predetermined combination of kelvins and lumens. The switch on the dimmer is a sliding switch. The off position of the controller turns off all control of the LED light sources by the controller. The color change is from 1800 kelvins to 3000 k. The dimming is from 2000 lumens to 20 lumens. The light fixture comprises an LED board for placement of the LED light sources.

A light fixture comprising: a. a housing; b. an LED board placed inside of the housing; c. a plurality of LED light sources placed on the LED board, the LED light sources having at least two different colors; d. an LED driver to power the LED light sources, the LED driver comprising a color changing module; and e. a controller with two switches, a first switch for manually changing the color of the LED light sources, and a second switch for turning on and off the controller input relating to the color of the LED light sources; wherein when the second switch is in the off position, a switch on a dimmer directly communicates with the driver, the module of the driver automatically (automatic mode) changing the color according to input received from a switch on the dimmer.

Provided is circuitry comprising: an LED driver to power the LED light sources, the LED driver comprising a color changing module; a controller with two switches, a first switch for manually changing the color of the LED light sources, and a second switch for turning on and off the controller input relating to the color of the LED light sources; wherein when the second switch is in the off position, a switch on a dimmer directly communicates with the driver, the module of the driver automatically (automatic mode) changing the color according to input received from a switch on the dimmer.

BRIEF DESCRIPTION OF THE FIGURES

FIG. 2 illustrates correspondence of color to lumens in the automatic mode.

FIG. 3 illustrates correspondence of color to lumens in the automatic mode.

DETAILED DESCRIPTION OF THE INVENTION

Figure 1:
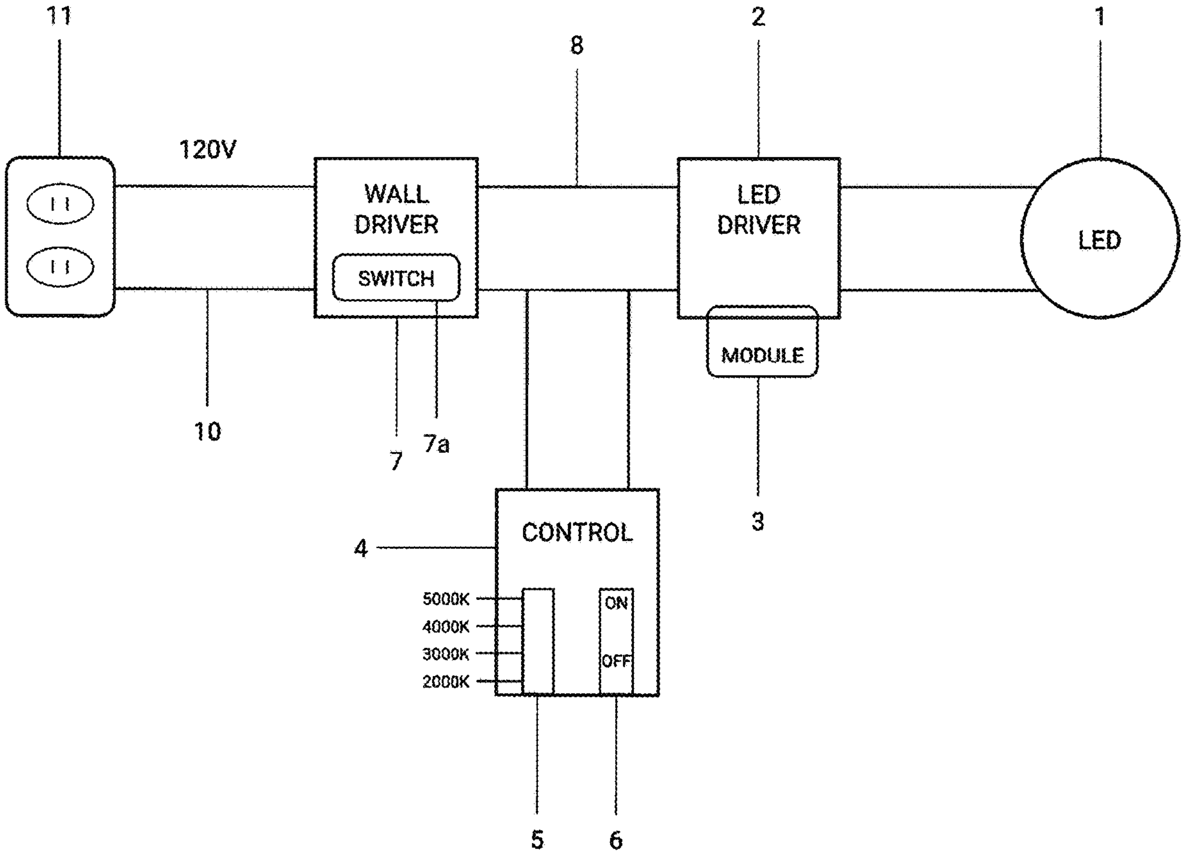
FIG. 1 illustrates the circuitry for dimming and color changing.

Provided is an LED driver/module 2, 3 and controller 4 integrated or connected to the light fixture, which can be a small downlight. The circuitry of the light fixture has an integrated light engine that allows a user slide switch the LED color temperature from 2000K to 2700K, 3000K, 3500K, 4000K, 50000K and adjust the lumen output easily. The dim to warm setting mimics incandescent light, warming the LED color temperature from 3000K to 1800K as dimmed by a user.

There are two slide switches 5, 6 on the back of the light fixture placed on a PCB (Printed Circuit Board) board (control/controller 4). One of switches 5 allows a user to change the color of the light manually, and the other switch 6 allows a user to adjust the CCT (correlated color temperature) using a wall dimmer by shutting off the circuitry of control 4. Dimming means reducing the output of a lamp or lighting fixture, which is measured in lumens (lm or L).

This configuration can include one electrical circuit with two dip switches 5, 6 located on control 4, which can be a PCB board with processors. The LED light sources 1 of the light fixture is in electronic communication with a dimmer wall 7, switch **7*a*. There are two dip switches 5, 6 on the light fixture: The light fixture can include LED light sources 1, LED driver 2, and control 4**.

The first dip switch allows a user to manually change the color temperature (CCT), while the dimmer 7 only adjusts the brightness of the LED light source 1.

The second dip switch 6 allows the dimmer to automatically change both the color temperature and the brightness simultaneously without requiring manual adjustment of the CCT. The second dip switch 6 shuts down the circuitry in control 4, allowing the dimmer 7 to electronically communicate directly with the LED driver 2, and the processor in the color changing module 3.

FIG. 1 illustrates a circuitry for controlling the dimming and color change of LED light sources 1. There can be a plurality of LED light sources 1 (Light Emitting Diode) light sources placed on LED board 21. The LED light sources 1 can have different colors.

The LEDs 1 are in communication with a driver 2. Driver 2 can have a color change module 3, which can include a programmed microprocessor. Driver 2 is in communication with a wall dimmer 7. The wall dimmer 7 is connected to a source of power with wires 10. The source of power can be an electric outlet 11.

The wall dimmer 7 has a sliding switch **7*a* that changes the dimming alone, or the combination of dimming and color. The control 4 can have a switch 5** for a manual and automatic color change mode. When the manual mode is selected, a user has to select the color with the second switch 5 on the controller, manually. As illustrated, the colors selected can be 2000K, 3000 k, 4000 k, and 5000 k. In this mode, the color is independent of the dimming. The switch 7*a* only adjusts the dimming in this mode. A user selects the color manually on the control 4, and then changes the dimming (lumens) by using the dimmer switch 7*a*, while the color remains constant.

When the switch 7 on the controller 4 is in the off-position, the controller 4 circuitry is shut-off. The dimmer 7 communicates directly with the LED driver 2. As the position of the dimmer 7 changes by a user, the color of the LED light source 1 also changes automatically depending on the dimming with the help of the color changing microprocessor in module 6. A user does not manually change the color. A particular lumen is associated with a particular color automatically. A user only changes the wall dimmer 7 by using sliding switch 7*a*.

FIG. 2 illustrates the ranges of color and lumens in one embodiment. The lumen can have a range of 20001 to 201 and the color can have a range of 3000 k to 1800 k. In the automatic mode, the combination of 20001/3000 k can be the maximum and the combination of 201/1800 k can be the minimum. The transition from one lumen/color combination to another combination can be automatic and gradual.

FIG. 3 illustrates correspondence of lumens to kelvin in the automatic mode by wall dimmer 7. The microprocessor in module 3 can be programed to associate a particular color with a particular lumen. As illustrated, the association is 3000 k/20001, 2500 k/13001, 2000 k/4001, and 1800 k/201.

The light fixture can be a recessed or surface mounted light or a troffer light fixture. The light fixture can have a housing 22, such as a circular housing. The light fixture can have an LED board 21, LEDs light sources 1 placed on the LED board 1, lens 14, glass light guide 13, and shading paper 20. The light fixture can have a height of less than three inches. The body of the light fixture can be made from aluminum or steel. The housing can have clips (spring brackets) 17 for attachment to a ceiling or a structure in a ceiling, a wire 16 that exits the housing, a wire cover 18, and fasteners 19 for attaching clips (spring brackets) 17 to the top of housing 22. Other light fixtures, can also have trims, and fasteners on top for mounting on a surface. Power from outlet 11 travels through wires 8, 10 to the LED light sources 1, which can comprise of differently colored individual LEDs. The LED light sources 1 can have two or three different colors that are placed one after another on board 21. The light fixture housing 22 can be a slim housing, having a height of less than three inches at any location, and a diameter of less than one foot.

Figure 4:
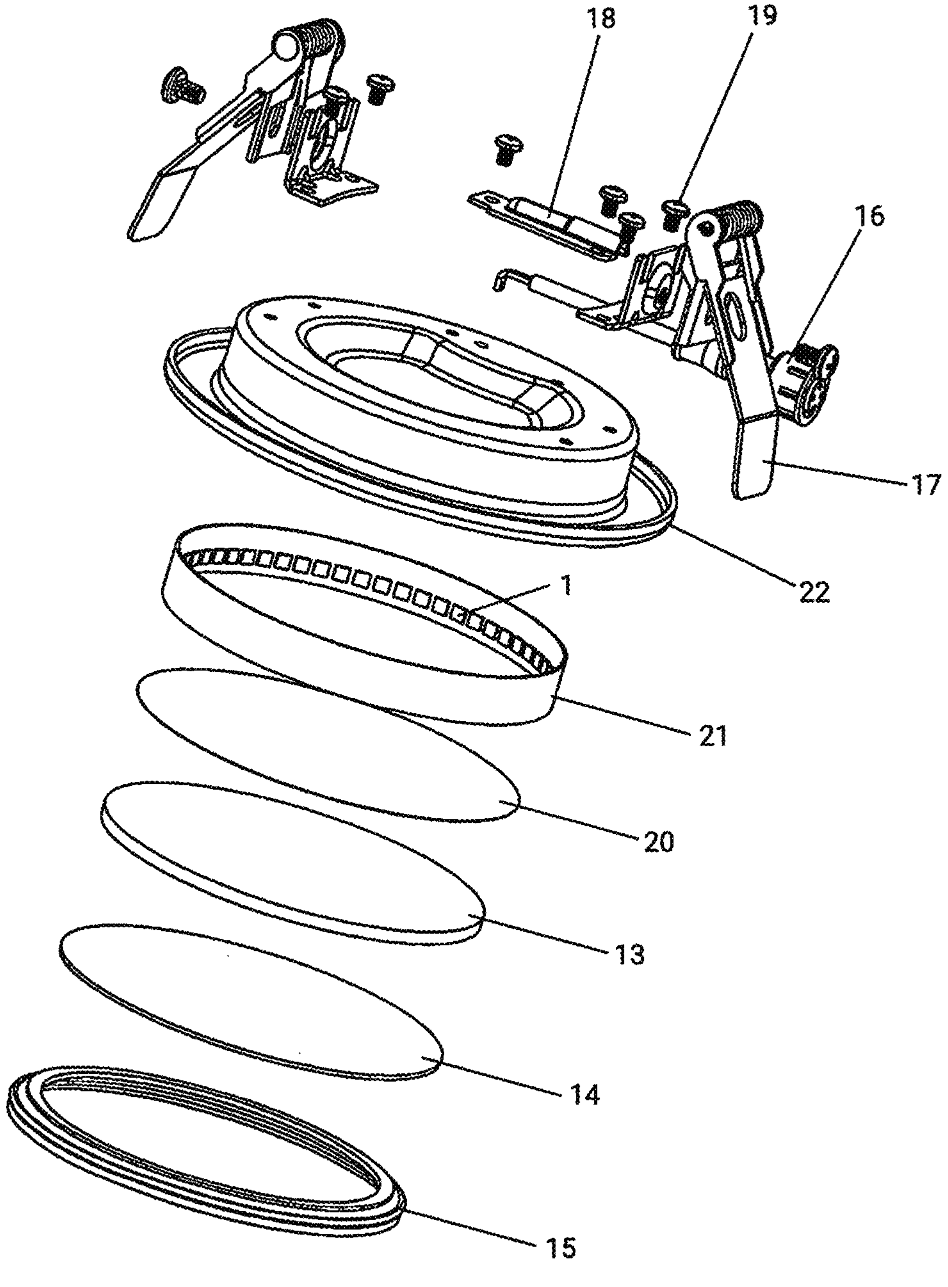
FIG. 4 illustrates an exploded view of a light fixture.

FIG. 4 illustrates a recessed light fixture where LED light source 1 is incorporated. In this embodiment, a fire rated fixture is illustrated. The above embodiments can be used with any fixture, including non-fire rated recessed and surface mounted lights.

Also provided are methods for adjusting color and dimming of a light fixture, in manual and automatic modes as described above.

U.S. Pat. No. 11,259,377 is incorporated herein by reference relating to teaching of switches, drivers, and multi-colored LEDs.

What is claimed is:

1. A light fixture comprising: a. a plurality of LED light sources, the LED light sources configured to produce differently colored lights; b. an LED driver to power the LED light sources, the LED driver a comprising a color changing module; C. a controller with two switches, the controller placed on a back of the a light fixture, a first switch for manually changing the color of the LED light sources, and a second switch for turning on and off the controller input relating to the color of the LED light sources; wherein when the second switch is in the off position, a switch on a dimmer placed remotely in relation to the light fixture, directly communicates with the driver, the module of the driver automatically changing the color according to input received from a switch on the dimmer, wherein the off position of the controller turns off all control of the LED light sources by the controller.

2. The light fixture of claim 1, wherein the light fixture has LED light sources with at least two different colors.

3. The light fixture of claim 1, wherein the module has a microprocessor.

4. The light fixture of claim 1, wherein the first switch and the second switch are dip switches.

5. The light fixture of claim 1, wherein in the automatic mode, changing a position of a switch on the dimmer changes the color and dimming together according to a predetermined combination of kelvins and lumens.

6. The light fixture of claim 1, wherein the switch on the dimmer is a sliding switch.

7. The light fixture of claim 1, wherein the color change is from 1800 kelvins to 3000 k.

8. The light fixture of claim 1, wherein the dimming is from 2000 lumens to 20 lumens.

9. The light fixture of claim 1, wherein the light fixture comprises an LED board for placement of the LED light sources.

10. A light fixture comprising: a. a housing; b. an LED board placed inside of the housing; c. a plurality of LED light sources placed on the LED board, the LED light sources having at least two different colors; d. an LED driver to power the LED light sources, the LED driver comprising a color changing module; and e. a controller with two switches, the controller placed on the light fixture, a first switch for manually changing the color of the LED light sources, and a second switch for turning on and off the controller input relating to fs the color of the LED light sources; wherein when the second switch is in the off position, a switch on a dimmer directly communicates with the driver, the module of the driver automatically changing the color according to input received from a switch on the dimmer, wherein the off position of the controller turns off all control of the LED a light sources by the controller, wherein in the automatic color changing mode, changing a position of a switch on the dimmer changes the color and dimming together according to a predetermined combination of kelvins and lumens.

11. The light fixture of claim 10, wherein the switch on the dimmer is a slide switch.

* * * * *